(12) United States Patent
Jarrard (10) Patent No.: US 8,022,694 B2
(45) Date of Patent: Sep. 20, 2011

(54) NON-CONTACTING POSITION SENSOR USING A ROTATING MAGNETIC VECTOR

(75) Inventor: Craig Allen Jarrard, Middlebury, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 12/816,887

(22) Filed: Jun. 16, 2010

(65) Prior Publication Data

US 2010/0253324 A1    Oct. 7, 2010

Related U.S. Application Data

(63) Continuation of application No. 11/254,574, filed on Oct. 20, 2005, now Pat. No. 7,741,839.

(51) Int. Cl.
*G01B 7/14* (2006.01)

(52) U.S. Cl. ........... 324/207.22; 324/207.2; 324/207.24; 324/207.25

(58) Field of Classification Search ............... 324/207.2, 324/207.25, 207.24, 207.22
See application file for complete search history.

(56) References Cited

U.S. PATENT DOCUMENTS

| | | | | | |
|---|---|---|---|---|---|
| 5,337,472 | A | * | 8/1994 | Leupold et al. | 29/607 |
| 5,351,387 | A | * | 10/1994 | Iwata et al. | 29/602.1 |
| 6,054,789 | A | * | 4/2000 | Leupold | 310/156.43 |
| 6,545,463 | B1 | * | 4/2003 | Dettmann et al. | 324/207.21 |
| 7,741,839 | B2 | * | 6/2010 | Jarrard | 324/207.2 |

* cited by examiner

*Primary Examiner* — Reena Aurora
(74) *Attorney, Agent, or Firm* — Daniel J. Deneufbourg (57) ABSTRACT

A sensor for sensing the position of an object includes a magnet and a magnetic flux sensor. The magnet has dimensions that include a length, a width and a height. The magnet is adapted to generate a flux field. The flux field has a magnitude of flux and a flux direction. The flux direction changes along at least one of the dimensions. The magnetic flux sensor is mounted adjacent the magnet. The magnet provides a rotating magnetic field vector. A method for magnetizing a magnet to create the rotating magnetic field vector is also disclosed.

10 Claims, 7 Drawing Sheets

NON-CONTACTING POSITION SENSOR USING A ROTATING MAGNETIC VECTOR

CROSS-REFERENCE TO RELATED APPLICATIONS

This application is a continuation application which claims the benefit of U.S. patent application Ser. No. 11/254,574 filed on Oct. 20, 2005, now U.S. Pat. No. 7,741,839 entitled Non-Contacting Position Sensor Using a Rotation Magnetic Vector, the disclosure of which is explicitly incorporated herein by reference, as are all references cited therein.

BACKGROUND OF THE INVENTION

I. Technical Field

This invention relates, in general, to non-contacting position sensors. More particularly, this invention relates to the magnetic configuration of a non-contacting position sensor that uses a magnetic flux sensor.

II. Background Art

Electronic devices are an increasingly ubiquitous part of everyday life. Electronic devices and components are presently integrated in a large number of products, including products traditionally thought of as primarily mechanical in nature, such as automobiles. This trend is almost certain to continue. To successfully integrate electronic and mechanical components, some type of interface between the two technologies is required. Generally, this interface is accomplished using devices such as sensors and actuators.

Position sensing is used to electronically monitor the position or movement of a mechanical component. The position sensor produces an electrical signal that varies as the position of the component in question varies. Electrical position sensors are an important part of innumerable products. For example, position sensors allow the status of various automotive parts to be monitored and controlled electronically.

A position sensor must be accurate, in that it must give an appropriate electrical signal based upon the position measured. If inaccurate, a position sensor will hinder the proper evaluation and control of the position of the component being monitored.

A position sensor must also be adequately precise in its measurement. The precision needed in measuring a position will obviously vary depending upon the particular circumstances of use. For some purposes only a rough indication of position is necessary, for instance, an indication of whether a valve is mostly open or mostly closed. In other applications, more precise indication of position may be needed.

A position sensor must also be sufficiently durable for the environment in which it is placed. For example, a position sensor used on an automotive valve will experience almost constant movement while the automobile is in operation. Such a position sensor must be constructed of mechanical and electrical components which are assembled in such a manner as to allow it to remain sufficiently accurate and precise during its projected lifetime, despite considerable mechanical vibrations and thermal extremes and gradients.

In the past, position sensors were typically of the "contact" variety. A contacting position sensor requires physical contact to produce the electrical signal. Contacting position sensors typically consist of potentiometers to produce electrical signals that vary as a function of the component's position. Contacting position sensors are generally accurate and precise. Unfortunately, the wear due to contact during movement of contacting position sensors has limited their durability. Also, the friction resulting from the contact can result in the sensor affecting the'operation of the component. Further, water intrusion into a potentiometer sensor can disable the sensor.

One important advancement in sensor technology has been the development of non-contacting position sensors. As a general proposition, a non-contacting position sensor ("NPS") does not require physical contact between the signal generator and the sensing element. As presented here, an NPS utilizes magnets to generate magnetic fields that vary as a function of position and devices to detect varying magnetic fields to measure the position of the component to be monitored. Often, a Hall effect device is used to produce an electrical signal that is dependent upon the magnitude and polarity of the magnetic flux incident upon the device. The Hall effect device may be physically attached to the component to be monitored and move relative to the stationary magnets as the component moves. Conversely, the Hall effect device may be stationary with the magnets affixed to the component to be monitored. In either case, the position of the component to be monitored can be determined by the electrical signal produced by the Hall effect device.

The use of an NPS presents several distinct advantages over the use of the contacting position sensor. Because an NPS does not require physical contact between the signal generator and the sensing element, there is less physical wear during operation, resulting in greater durability of the sensor. The use of an NPS is also advantageous because the lack of any physical contact between the items being monitored and the sensor itself results in reduced drag upon the component by the sensor.

While the use of an NPS presents several advantages, there are also several disadvantages that must be overcome in order for an NPS to be a satisfactory position sensor for many applications. Magnetic irregularities or imperfections may compromise the precision and accuracy of an NPS. The accuracy and precision of an NPS may also be affected by the numerous mechanical vibrations and temperature changes likely to be experienced by the sensor. Because there is no physical contact between the item to be monitored and the sensor, it is possible for them to be knocked out of alignment by such vibrations. A misalignment will result in the measured magnetic field at any particular location not being what it would be in the original alignment. Because the measured magnetic field will be different than that when properly aligned the perceived position will be inaccurate. Linearity of magnetic field strength and the resulting signal is also a concern.

Some of these challenges to the use of an NPS have been addressed in existing devices, most notably the devices of U.S. Pat. Nos. 5,712,561 and 6,211,668.

There remains, however, a continuing need for an improved position sensor that displays minimal deviations due to changes in temperature and that can be adapted for use over a wide range of measurement distances and angles.

SUMMARY OF THE INVENTION

A feature of the invention is to provide a sensor that includes a magnet. The magnet has dimensions that include a length, a width and a height. The magnet is adapted to generate a flux field. The flux field has a magnitude of flux and a flux direction. The flux direction changes along at least one of the dimensions.

Another feature of the invention is to provide a magnet that provides a rotating magnetic field vector.

Yet another feature of the invention is to provide a method for magnetizing a magnet to create a rotating magnetic field vector.

It is noted that the drawings of the invention are not to scale.

DETAILED DESCRIPTION

Referring to FIGS. 1-4 a non-contacting position sensor 20 is shown. Sensor 20 is adapted for use in monitoring the rotational position of an attached object that moves such as a shaft 22. Shaft 22 can be connected to any moving object such as a butterfly valve in an engine throttle body. Position sensor 20 includes a magnet 30 and a magnetic flux sensor 50. Magnet 30 can be rotated through 360 degrees and can measure continuous rotation of an object.

As the magnetic field generated by the magnet 30 and detected by flux sensor 50 varies sinusoidally with rotation, an electrical signal is produced by sensor 50 that allows the position of the object to be monitored to be ascertained.

Magnet 30 is cylindrical in shape and has an inner surface 32, an outer surface 34, end faces 35 and 36 and an interior cavity 38. Magnet 30 generates a flux field that contains a flux vector that has a relatively constant flux density but a changing direction. A pole piece (not shown) may be used with magnet 30 to further control or direct the flux generated by magnet 30. Magnetic flux sensor 50 can be a multi-axis hall effect device that is commercially available from Melexis Microelectronic Systems of Concord, N.H. Other multi-axis hall effect devices could also be used. A multi-axis hall effect sensor can measure flux direction by taking the ratio of flux density in 2 orthogonal planes. Magnetic flux sensor 50 has several electrical leads 52 that are used to supply power, ground and an output signal from sensor 50. Magnetic flux sensor 50 has electrical leads 52. A printed circuit board or lead frame (not shown) is adapted to hold flux sensor 50 in the proper position spaced from magnet 30 by an air gap 37. Air gap 37 is located between magnet 30 and flux sensor 50. Magnetic flux from magnet 30 is established across air gap 37 and is sensed by flux sensor 50.

Figure 1:
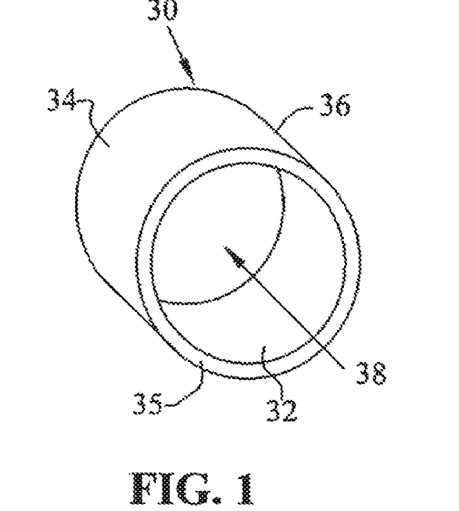
FIG. 1 illustrates a perspective view of a magnet in accordance with the present invention.
Figure 2:
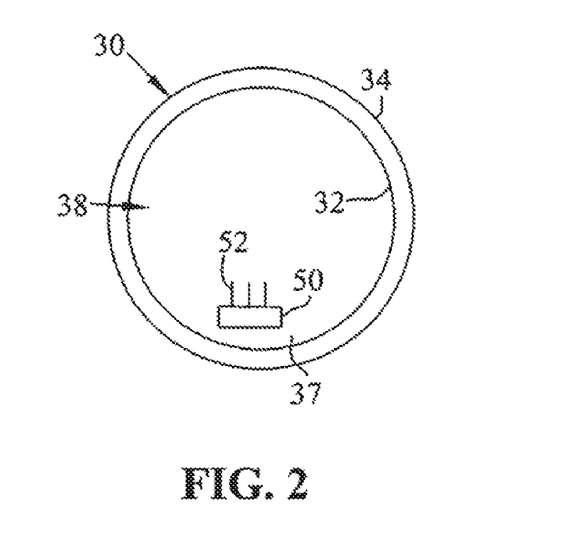
FIG. 2 illustrates a front elevation view of FIG. 1 with a magnetic flux sensor.
Figure 3:
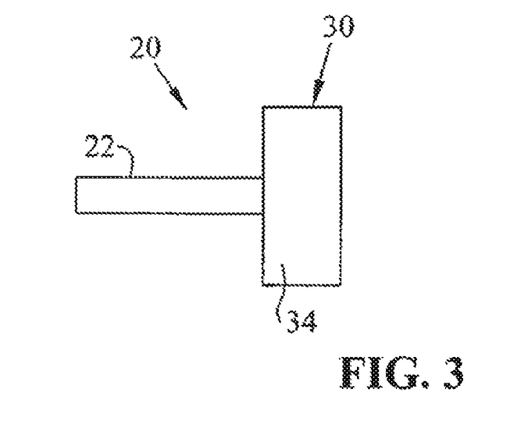
FIG. 3 illustrates a side elevation view of FIG. 1.
Figure 4:
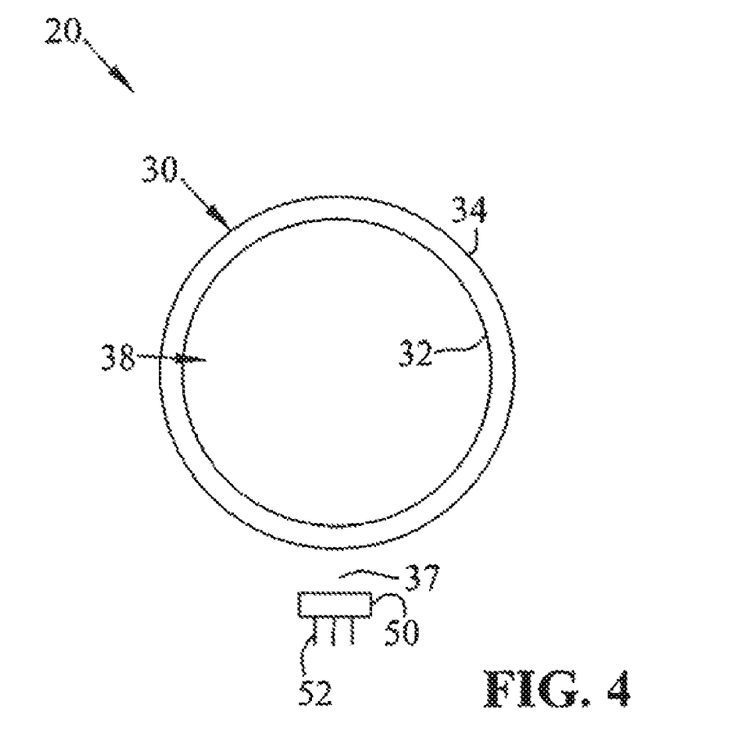
FIG. 4 illustrates a front elevation view of FIG. 1 with an alternative magnetic flux sensor location.

In FIG. 2, the magnetic flux sensor 50 is mounted in cavity 38 adjacent to inner surface 32. Alternatively, as shown in FIG. 4, sensor 50 can be mounted outside the magnet adjacent outer surface 34. Magnet 30 can be formed of any suitable magnetic material, such as samarium cobalt, neodymium-iron-boron or ferrite.

Figure 5:
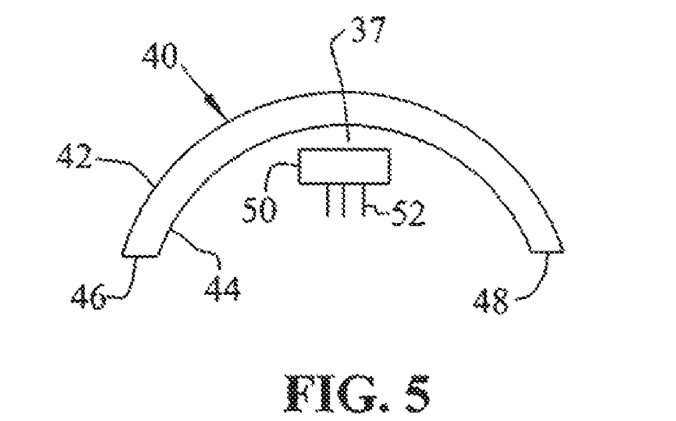
FIG. 5 illustrates a front elevation view of an alternative embodiment of a magnet and magnetic flux sensor in accordance with the present invention.

In another embodiment, shown in FIG. 5, only half of the magnet 30 may be used. Semi-cylindrical magnet 40 has an inner surface 44, an outer surface 42 and end faces 46 and 48. Magnetic flux sensor 50 can be mounted adjacent interior surface 44. Magnet 40 can be used to measure up to 180 degrees of rotation of an attached object.

Figure 6:
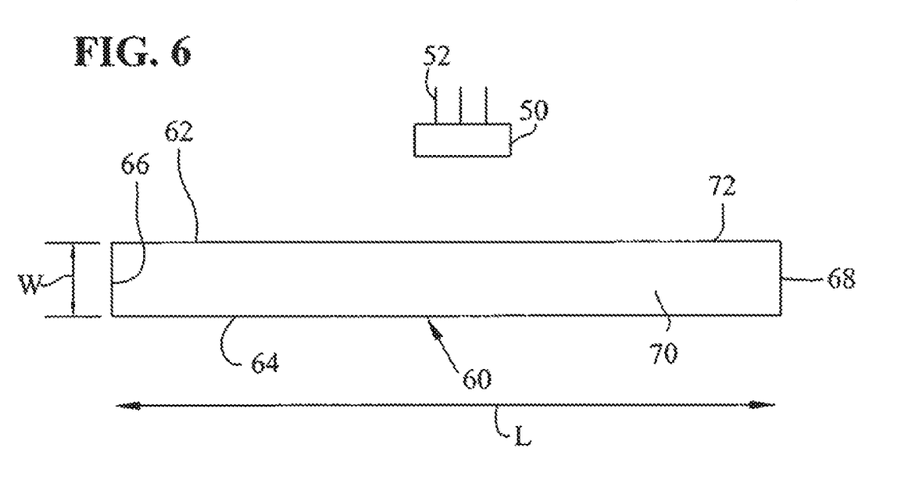
FIG. 6 illustrates a top plan view of an alternative embodiment of a magnet and magnetic flux sensor in accordance with the present invention.
Figure 7:
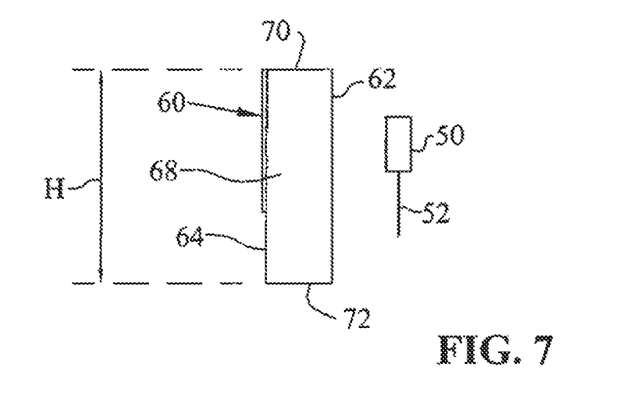
FIG. 7 illustrates a side elevation view of FIG. 6.

Turning to FIGS. 6 and 7, another embodiment of a magnet 60 is shown. Magnet 60 has a rectangular shape and is in the form of an elongated bar having outer surfaces 62, 64, 66, 68, 70 and 72. Magnet 60 has dimensions including a length L, a width W and a height H. Magnetic flux sensor 50 can be mounted adjacent surface 62. Magnet 60 can be used to measure linear travel of an attached object.

Alternatively, magnet 60 can be made from thin bonded ferrite and subsequently bent and affixed into a shape similar to magnet 30. In this manner, magnet 60 can be used to measure the rotary position of an attached object. Further, if magnet 60 is a flexible bonded ferrite magnet material, it can be formed into a ring shape for use in a rotary sensor and may be fitted into a housing. Magnet 60 may also be formed by molding. Magnet 60 can be magnetized in a straight shape and then bent into a circular shape. Alternatively, magnet 60 could also be magnetized after it has been formed into a round shape.

Magnet 60 can also be used to make a through-hole sensor in which a shaft extends through a hole along the axis of rotation of the magnet. This design allows the flexibility to place a magnetic flux sensor on the inside or outside of the magnet as needed.

Figure 8:
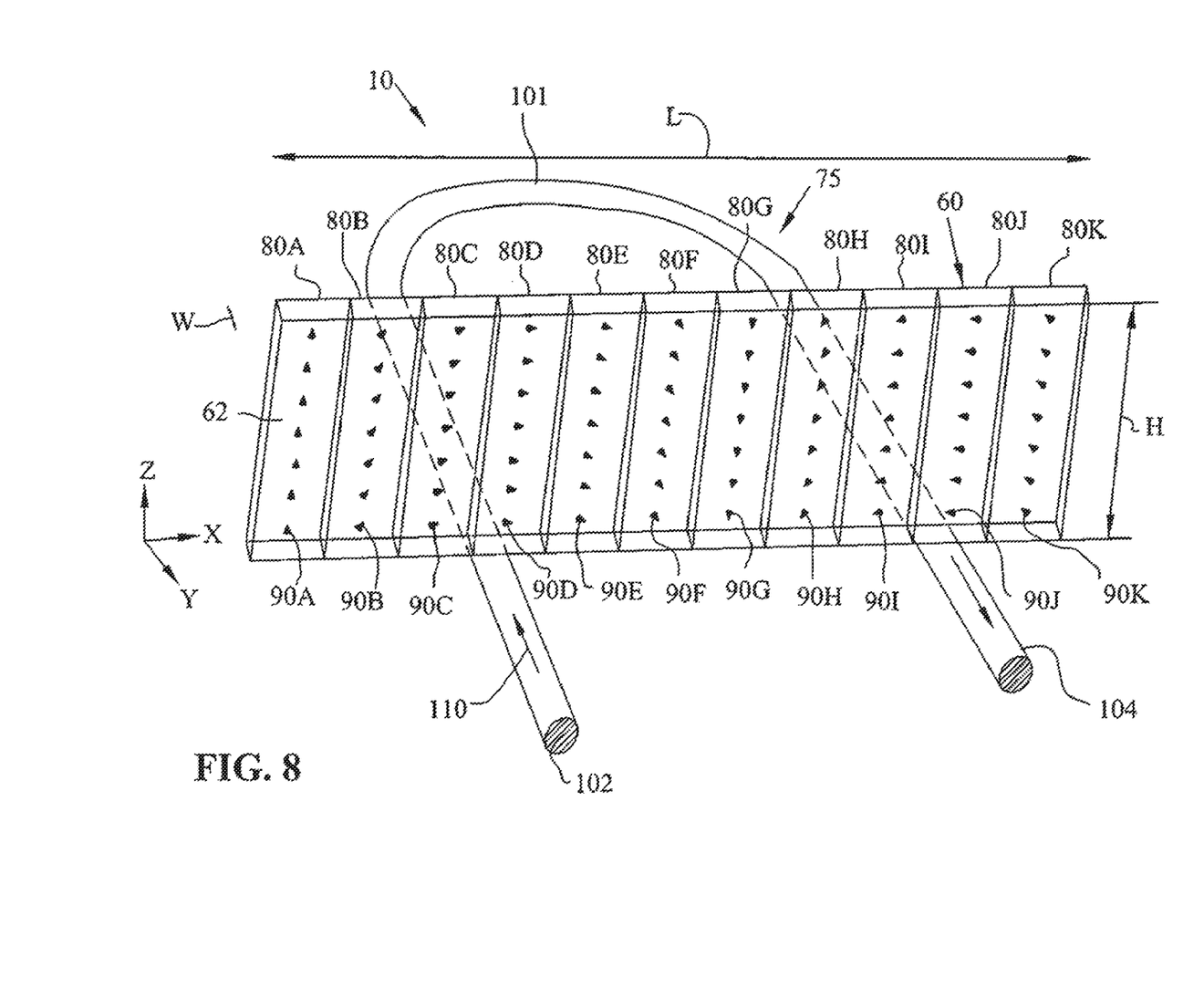
FIG. 8 illustrates a magnetizing fixture and flux vector diagram for the magnet of FIG. 6 showing the rotating magnetic vector.

FIG. 8 illustrates a more detailed view of bar magnet 60 showing a magnetization pattern 75 and flux vectors generated by magnet 60. For the convenience of understanding the operation of the present invention, magnet 60 is designated in several adjacent segments or sections 80A, 80B, 80C, 80D, 80E, 80F, 80G, 80H, 80I, 80J, and 80K. Sections 80A-K will be used to illustrate how the flux vectors generated by magnet 60 vary or change with position. In reality, these segments do not exist within magnet 60 and the change in the flux vector is continuous when moving along at least one dimension of magnet 60. Each segment 80 has an associated flux vector 90. Flux vectors 90A, 90B, 90C, 90D, 90E, 90F, 90G, 90H, 90I, 90J and 90K each have a flux magnitude and a flux direction.

The flux direction continuously changes or rotates when moving from segment 80A towards segment 80K along length L. A reference axis of X, Y and Z directions are shown in the lower left hand corner of FIG. 8. The rotating flux direction is created by rotating the magnetization direction within magnet 60. The flux direction in FIG. 8 is shown changing in the X-Z plane. Other planes can also be used as will be discussed later.

Figure 9:
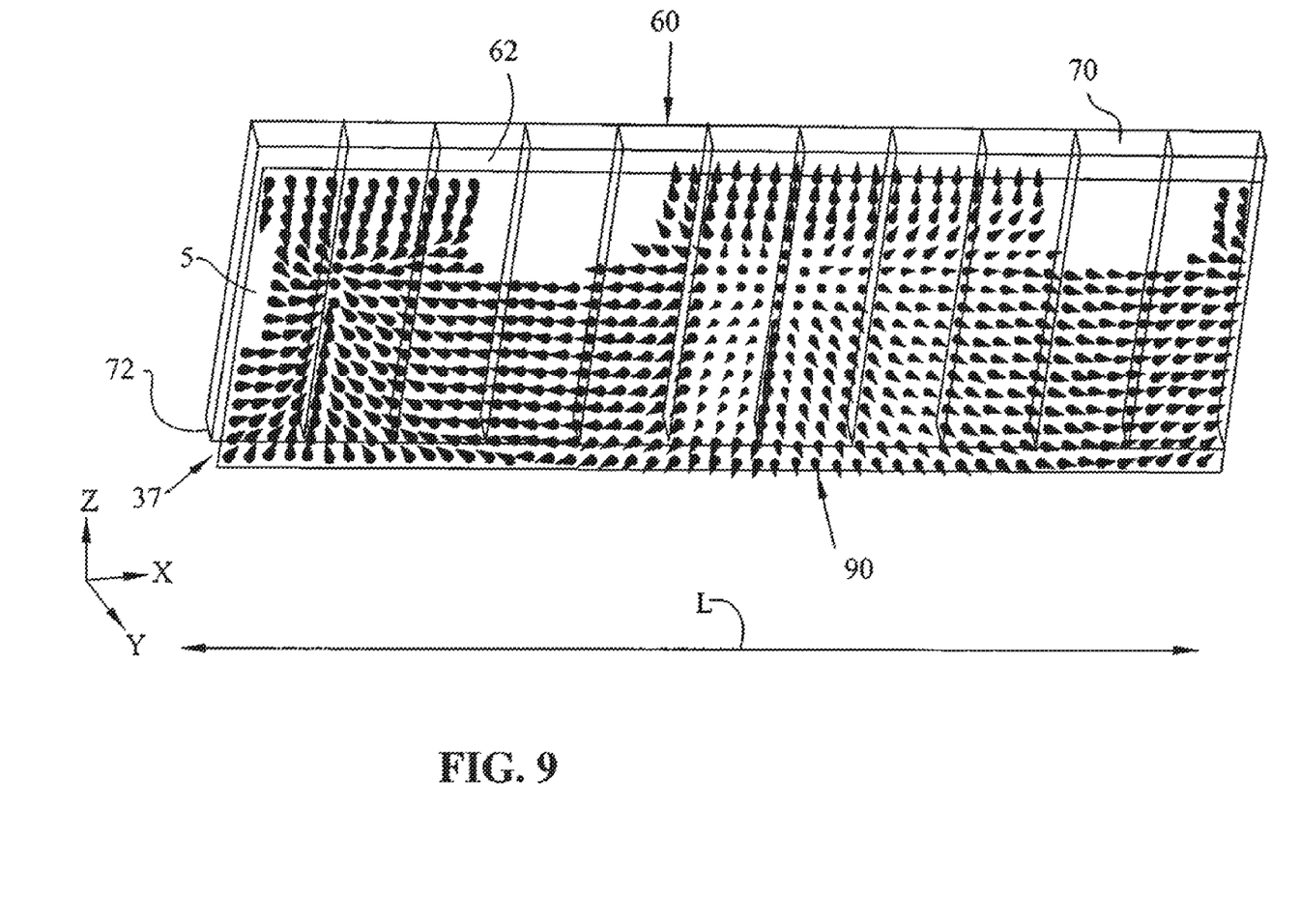
FIG. 9 illustrates the flux density for the magnet of FIG. 8 in the plane of the sensor at the nominal airgap between the magnet and sensor.

Referring to FIG. 9, the flux vectors 90 for magnet 60 were generated using a computer simulation program. The flux vectors 90 are shown at a distance of 0.1 inch from the magnet surface 62. A sensing plane 150 was used to simulate the position of flux sensor 50 as magnet 60 is moved along length L. Flux sensor 50 positioned 0.1 inch from the magnet surface would detect this changing flux vector as magnet 60 is moved along length L.

It is noted in FIG. 9 that magnetic vectors 90 have a sizable magnetic field called Bz or a Z axis component as one moves from the bottom surface 72 to the top surface 70 of the magnet. The magnetic field B is measured in Gauss or Tesla. This magnetic field Bz component is parasitic to the magnetic field Bx & By components in the X and Y directions and is minimized near the bottom surface 72 of the magnet 60.

Flux sensor 50 creates three intermediary electrical signals Sx, Sy and Sz that are proportional to the strength of the magnetic field in each direction. Signals Sx, Sy and Sz are internal to and contained in sensor 50. An electrical output signal is provided on one of the electrical leads 52. Sensor 50 calculates the output signal by using a proportion of the arctangent of the ratio of these flux densities. This signal has a saw-tooth shape and represents the flux direction that is independent of flux density amplitude variation. For the magnet shown in FIGS. 8 and 9, the Sx and Sz signals are of interest because the flux direction is rotating in the X-Z plane.

Figure 10:
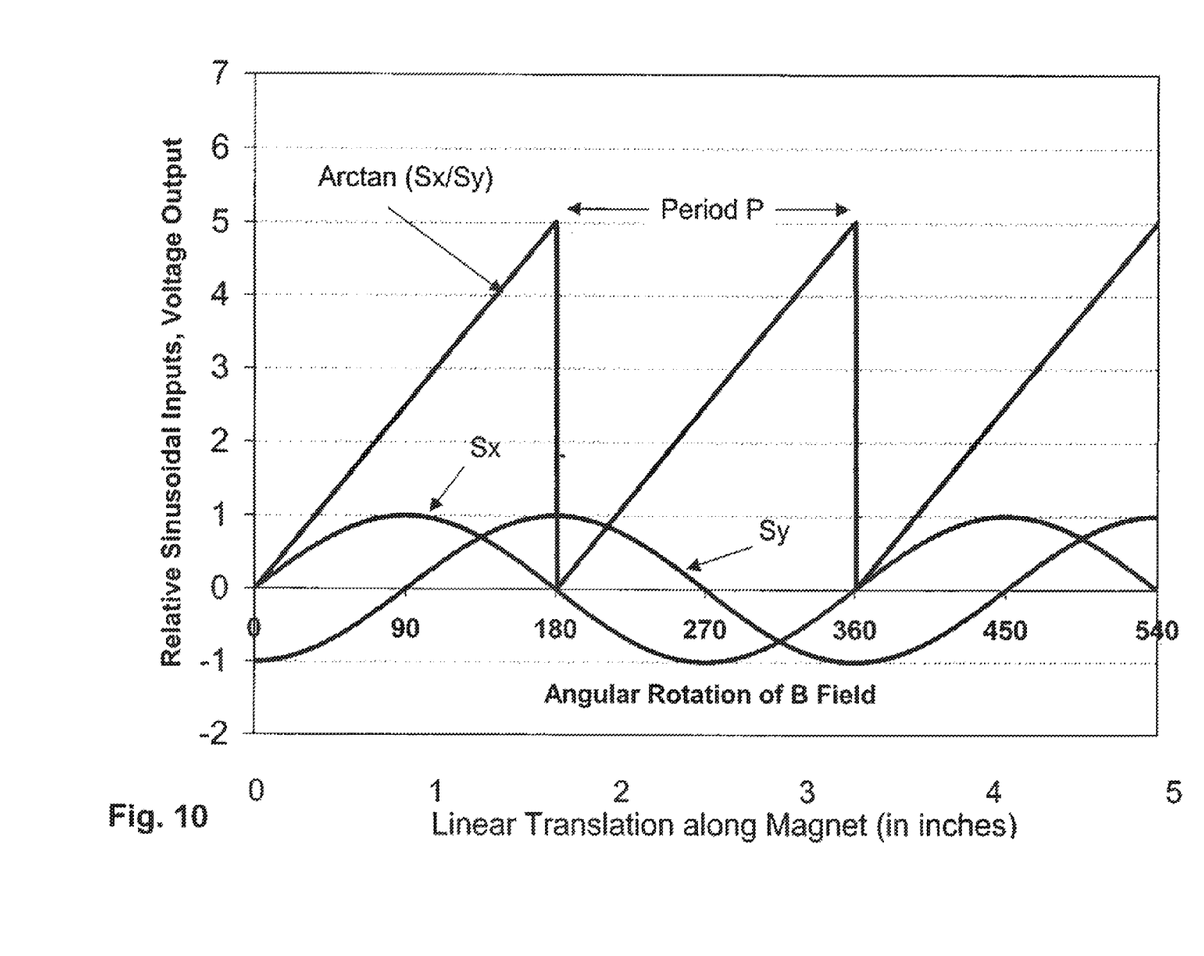
FIG. 10 illustrates a graph of magnetic flux density versus magnet position for the magnet of FIG. 6.

FIG. 10 is a graph of magnetic field strength as a function of linear position along magnet length L. FIG. 10 shows the output signals Sx and Sz from sensor 50 corresponding to the Bx and Bz flux vectors for magnet 60. The Sy signal is not shown in FIG. 10 as it is not needed in order to determine the position of magnet 60.

The arctangent of the ratio for a line down the vertical midpoint of the sensing plane is shown in FIG. 10 and is labeled Arctan. It is noted that the Arctan line is linear and has a period P. The length of period P corresponds to the Length L of the magnet.

FIG. 8 also shows a magnetization fixture 100 that is needed to create the magnetization pattern 75 in magnet 60. Magnetization FIG. 100 includes a wire 101 that has ends 102 and 104. Wire 101 can be a copper wire that is connected to a source of electrical power (not shown). Current 110 flowing through wire 101 causes a magnetic field corresponding to magnetization pattern 75 to be imposed upon and imparted to magnet 60. It is noted that the distance between wire ends 102 and 104 and the distance between the magnet and wire allows for tailoring of the period of the vector rotation or how fast the flux vector rotates along the length of the magnet.

The present invention has several advantages. One advantage is that the flux density of flux vectors 90A-K results in the output signal sensed by flux sensor 50 being independent of all amplitude related variations of the magnet, temperature variation being one of the variations. Therefore, additional temperature compensation devices and circuits are not needed. Another advantage is that the sensing period of sensor 20 can easily be changed. The period of the vector rotation or how fast the flux vector rotates along the length of the magnet can be changed by adjusting magnetization fixture 100. The period can be changed by selecting the physical dimension and spacing of wire 101.

It should be appreciated that the present invention may be readily adapted for use in measuring rotations of any angular dimension or in measuring any linear movements. The invention may be used to measure rotations of three hundred and sixty degrees or more, using an electronic counter for multiple revolutions.

Figure 11:
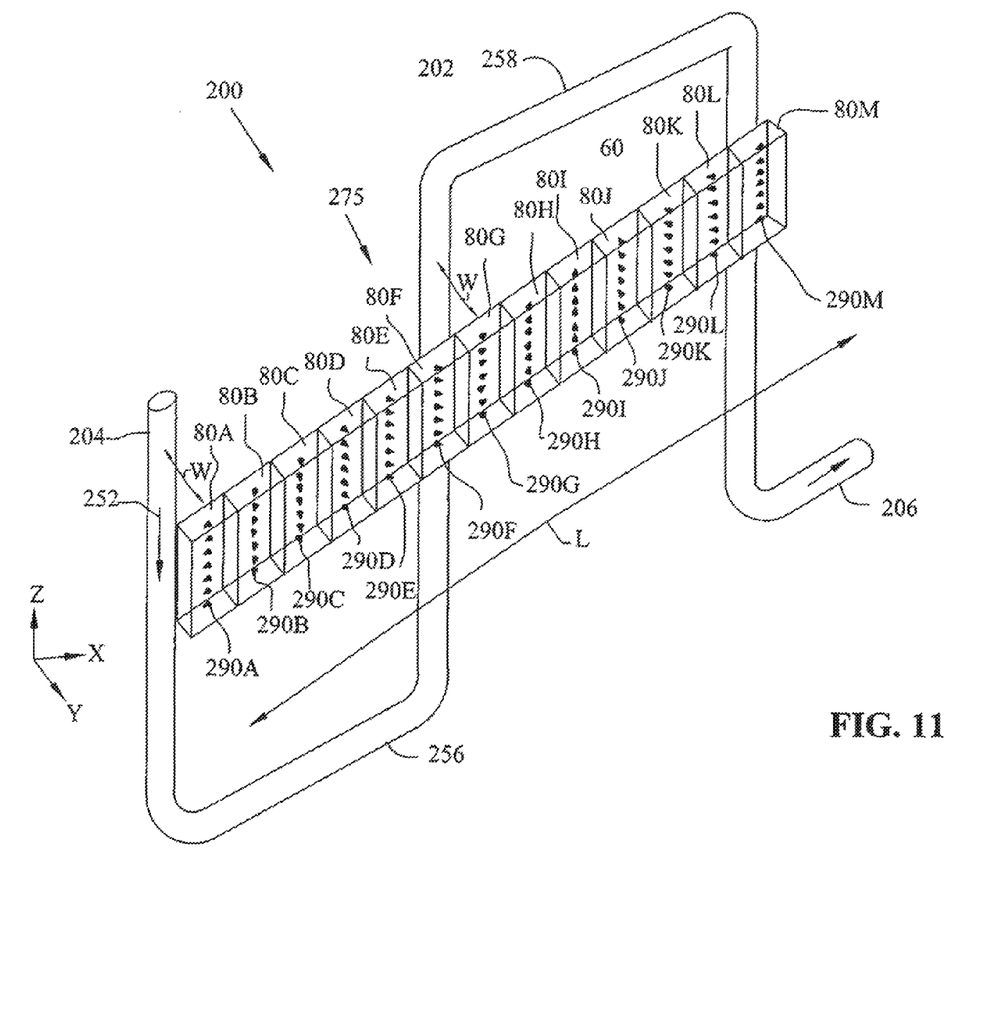
FIG. 11 illustrates an alternative magnetizing fixture and flux vector diagram for the magnet of FIG. 6 showing the rotating magnetic vector.

Referring to FIG. 11, an alternative magnetizing fixture 200 and flux vector diagram for magnet 60 is shown. FIG. 11 illustrates a magnetization pattern 275 and flux vectors generated by magnet 60. For the convenience of understanding the operation of the present invention, magnet 60 is designated in several adjacent segments or sections 80A, 80B, 80C, 80D, 80E, 80F, 80G, 80H, 80I, 80J, 80K, 80L and 80M. Sections 80A-M will be used to illustrate how the flux vectors generated by magnet 60 vary or change with position. In reality, these segments do not exist within magnet 60 and the change in the flux vector is continuous when moving along at least one dimension of magnet 60. Each segment 80 has an associated flux vector 290. Flux vectors 290A, 290B, 290C, 290D, 290E, 290F, 290G, 290H, 290I, 290J, 290K, 290L and 290M each have a flux magnitude and a flux direction.

The flux direction continuously changes or rotates when moving from segment 80A towards segment 80M along length L. A reference axis of X, Y and Z directions are shown in the lower left hand corner of FIG. 11. The rotating flux direction is created by rotating the magnetization direction within magnet 60. The flux direction in FIG. 11 is shown changing in the X-Y plane. Other planes can also be used such as the Y-Z plane.

FIG. 11 also shows a magnetization fixture 200 that is needed to create the magnetization pattern 275 in magnet 60. Magnetization fixture 200 includes a wire 202 that has ends 204 and 206 and U-shaped portions 254 and 256. Wire 202 can be a copper wire that is connected to a source of electrical power (not shown). Current 252 flowing through wire 201 causes a magnetic field corresponding to magnetization pattern 275 to be imposed upon and imparted to magnet 60. It is noted that the distance between wire ends 204 and 206 and the distance between U-shaped sections 256 and 258 and the distance between the magnet and wire allows for tailoring of the period of the vector rotation or how fast the flux vector rotates along the length of the magnet.

Although the invention has been taught with specific reference to these embodiments, someone skilled in the art will recognize that many other changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A sensor comprising:
   a) a magnet having opposed first and second longitudinal surfaces defining an interior, the magnet generating a flux in the interior of the magnet having at least three different flux directions, the flux directions in the interior of the magnet being oriented in a relationship generally parallel to the first and second longitudinal surfaces and varying along at least one dimension of the magnet;
   b) the magnet or a flux sensor associated with the sensor being adapted for movement whereby the flux directions can be measured as the magnet or flux sensor is moved wherein the flux defines a flux vector comprised of at least two orthogonal magnetic field components and wherein the flux direction is measured by performing an arctangent calculation of the density of the two orthogonal components.

2. The sensor of claim 1, wherein the two orthogonal components vary sinusoidally.

3. The sensor of claim 2, wherein the two orthogonal components are one quarter period out of phase.

4. The sensor of claim 1, wherein the flux direction is represented by a saw-tooth shaped electrical signal which is independent of flux density amplitude variation.

5. The sensor of claim 1, wherein the flux direction has a period and/or speed of rotation along the at least one dimension of the magnet which can be changed.

6. The sensor of claim 1, wherein the magnet is made of a bendable flexible material.

7. A sensor comprising:
   a) a magnet having at least first and second surfaces, the magnet adapted to generate a flux field therewithin, the flux field having at least three flux directions that change along at least one dimension of the magnet, the flux directions being aligned with the first and second surfaces;

b) a magnetic flux sensor mounted in proximity to the magnet, the magnet and the magnetic flux sensor being moveable relative to each other in a first direction, the magnetic flux sensor being adapted to sense the directions of the flux and generate an electrical signal that is representative of the directions of the flux, at least one of the three flux directions being the same as the first direction of movement of the magnet relative to the magnetic flux sensor wherein the flux defines a flux vector comprised of at least two orthogonal magnetic field components and wherein the flux direction is measured by performing an arctangent calculation of the density of the two orthogonal components.

8. The sensor of claim 7, wherein the magnet is attached to a moveable object for sensing the position of the movable object.

9. The sensor of claim 7, wherein the magnet is moved along the one dimension.

10. The sensor of claim 7, wherein the direction of the flux has an adjustable rotation period.

* * * * *